United States Patent
Hui et al.

(10) Patent No.: US 9,450,642 B2
(45) Date of Patent: Sep. 20, 2016

(54) POWER CONSERVATION AND LATENCY MINIMIZATION IN FREQUENCY HOPPING COMMUNICATION NETWORKS

(75) Inventors: Jonathan W. Hui, Foster City, CA (US); Wei Hong, Berkeley, CA (US); Lik Chuen Alec Woo, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 589 days.

(21) Appl. No.: 13/180,853

(22) Filed: Jul. 12, 2011

(65) Prior Publication Data

US 2013/0016759 A1     Jan. 17, 2013

(51) Int. Cl.
*H04B 1/00* (2006.01)
*H04B 1/713* (2011.01)

(52) U.S. Cl.
CPC ..................... *H04B 1/713* (2013.01)

(58) Field of Classification Search
USPC ................ 375/132, 134, 135, 136, 316, 285
See application file for complete search history.

(56) References Cited

U.S. PATENT DOCUMENTS

| | | | |
|---|---|---|---|
| 5,299,198 A * | 3/1994 | Kay et al. ..................... | 370/347 |
| 6,132,306 A | 10/2000 | Trompower | |
| 6,414,955 B1 * | 7/2002 | Clare et al. .................... | 370/390 |
| 6,594,273 B1 * | 7/2003 | McGibney ..................... | 370/442 |
| 6,732,163 B1 | 5/2004 | Halasz | |
| 6,961,323 B1 | 11/2005 | Xu et al. | |
| 7,424,268 B2 | 9/2008 | Diener et al. | |
| 7,606,335 B2 | 10/2009 | Kloper et al. | |
| 7,634,536 B2 | 12/2009 | Halasz | |
| 7,826,463 B2 | 11/2010 | Patel et al. | |
| 7,826,560 B2 | 11/2010 | Raleigh et al. | |
| 7,978,725 B2 | 7/2011 | Gong et al. | |
| 8,059,011 B2 * | 11/2011 | Van Wyk et al. ......... | 340/870.11 |
| 2002/0003812 A1 * | 1/2002 | Haartsen ....................... | 370/474 |
| 2002/0097681 A1 * | 7/2002 | Treister et al. ................ | 370/238 |
| 2002/0191678 A1 * | 12/2002 | Batra et al. .................... | 375/132 |
| 2003/0119452 A1 * | 6/2003 | Kim et al. ....................... | 455/69 |
| 2006/0072602 A1 | 4/2006 | Achanta | |
| 2006/0128308 A1 * | 6/2006 | Michael et al. ............. | 455/41.2 |

(Continued)

OTHER PUBLICATIONS

"RPL: IPv6 Routing Protocol for Low Power and Lossy Networks" <draft-ietf-roll-rpl-19> by Winter, at al. (Mar. 13, 2011 version).

*Primary Examiner* — Shuwang Liu
*Assistant Examiner* — Sung Ahn
(74) *Attorney, Agent, or Firm* — Parker Ibrahim & Berg LLC; James M. Behmke; Stephen D. LeBarron

(57) ABSTRACT

In one embodiment, a communication device samples a particular frequency hopping sequence during only a particular specified sub-timeslot of a timeslot. If a transmission energy is not detected during the specified sub-timeslot, the device turns off its receiver for a remainder of the timeslot. Otherwise, it continues to sample the particular frequency hopping sequence for at least one or more additional sub-timeslots of the remainder of the timeslot. In another embodiment, a communication device determines whether a neighboring communication device is operating in a first mode or a second mode. If in the second mode, it transmits a transmission to the neighboring communication device starting at any sub-timeslot of the plurality of sub-timeslots. If in the first mode, it transmits the transmission to the neighboring communication device while ensuring that the transmission is actively energized during a particular specified sub-timeslot.

11 Claims, 16 Drawing Sheets

(56) References Cited

U.S. PATENT DOCUMENTS

| | | |
|---|---|---|
| 2006/0215583 A1 | 9/2006 | Castagnoli |
| 2006/0251122 A1* | 11/2006 | Abe et al. .................... 370/477 |
| 2007/0206547 A1 | 9/2007 | Gong et al. |
| 2010/0046498 A1* | 2/2010 | Hall .............................. 370/350 |
| 2010/0061362 A1* | 3/2010 | Wang et al. ................... 370/350 |
| 2013/0107776 A1* | 5/2013 | Batchu et al. ................ 370/311 |

* cited by examiner

POWER CONSERVATION AND LATENCY MINIMIZATION IN FREQUENCY HOPPING COMMUNICATION NETWORKS

TECHNICAL FIELD

The present disclosure relates generally to wireless communication, and, more particularly, to power consumption in frequency hopping wireless networks.

BACKGROUND

Mesh networks are composed of two or more electronic devices each containing at least one transceiver. The electronic devices use their transceivers to communicate with one another and/or a central device. If the device wishes to communicate with another device that is out of transmission range, the device may communicate via multi-hop communication through other devices. Because the devices may rely on a small source of stored energy (e.g., batteries or a capacitor), it is desirable for those devices to reduce power. In particular, the transceiver, when placed in receive mode, can require significant power and quickly drain a small source of stored energy. This is especially problematic during a power outage of a main power supply, when only a limited lifespan of the backup power (e.g., battery or capacitor) may be used to transmit information.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
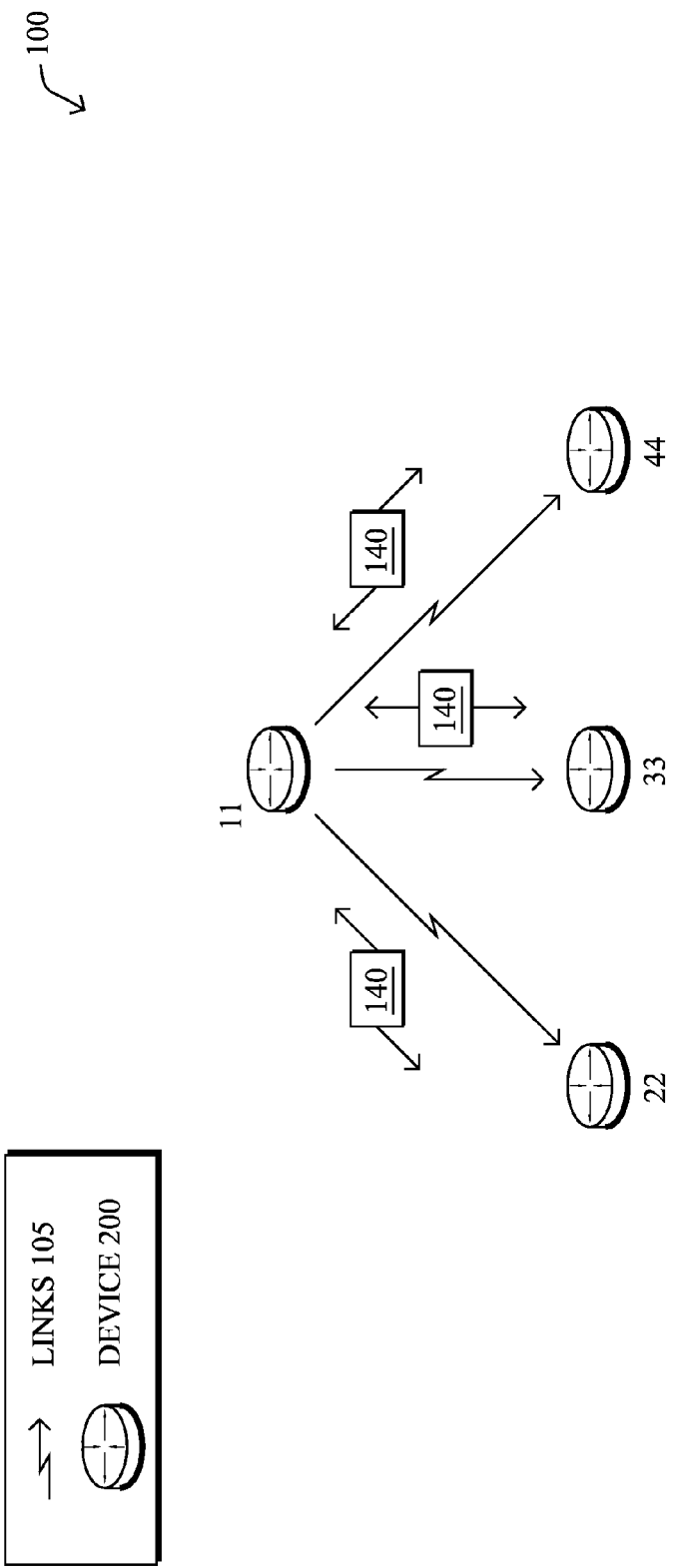
FIG. 1 illustrates an example wireless network.

According to one or more embodiments of the disclosure, a communication device samples a particular frequency hopping sequence during only a particular specified sub-timeslot of a timeslot. If a transmission energy is not detected during the specified sub-timeslot, the device turns off its receiver for a remainder of the timeslot. Otherwise, it continues to sample the particular frequency hopping sequence for at least one or more additional sub-timeslots of the remainder of the timeslot.

According to one or more additional embodiments of the disclosure, a communication device determines whether a neighboring communication device is operating in a first mode or a second mode. If in the second mode, it transmits a transmission to the neighboring communication device starting at any sub-timeslot of the plurality of sub-timeslots. If in the first mode, it transmits the transmission to the neighboring communication device while ensuring that the transmission is actively energized during a particular specified sub-timeslot.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

A wireless network, in particular, is a type of shared media network where a plurality of nodes communicate over a wireless medium, such as using radio frequency (RF) transmission through the air. For example, a Mobile Ad-Hoc Network (MANET) is a kind of wireless ad-hoc network, which is generally considered a self-configuring network of mobile routes (and associated hosts) connected by wireless links, the union of which forms an arbitrary topology. For instance, Low power and Lossy Networks (LLNs), e.g., certain sensor networks, may be used in a myriad of applications such as for "Smart Grid" and "Smart Cities" (e.g., for Advanced Metering Infrastructure or "AMI" applications) and may often consist of wireless nodes in communication within a field area network (FAN). LLNs are generally considered a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

FIG. 1 is a schematic block diagram of an example (and vastly simplified) computer network 100 (e.g., wireless or otherwise) illustratively comprising nodes/devices 200 (e.g., labeled as shown, "11," "22," "33," and "44") interconnected by frequency-hopping communication links 105, as described below. In particular, certain nodes 200, such as, e.g., routers, sensors, computers, radios, etc., may be in communication with other nodes 200, e.g., based on distance, signal strength, current operational status, location, etc. Those skilled in the art will understand that any number of nodes, devices, links, etc. may be used in the wireless network, and that the view shown herein is for simplicity (particularly, that while routers are shown, any wireless communication devices 11-44 may be utilized). Also, while the embodiments are illustratively shown herein with reference to a generally wireless network, the description is herein is not so limited, and may be applied to networks that have wired links, wireless links, PLC links, etc.

Data transmissions 140 (e.g., traffic, packets, messages, etc. sent between the devices/nodes) may be exchanged among the nodes/devices of the computer network 100 using predefined network communication protocols such as certain known wireless protocols (e.g., IEEE Std. 802.15.4, WiFi, Bluetooth®, etc.) or other shared media protocols where appropriate (e.g., PLC). As described herein, the communication may be based on a frequency-hopping protocol. In this context, a protocol consists of a set of rules defining how the nodes interact with each other.

Figure 2:
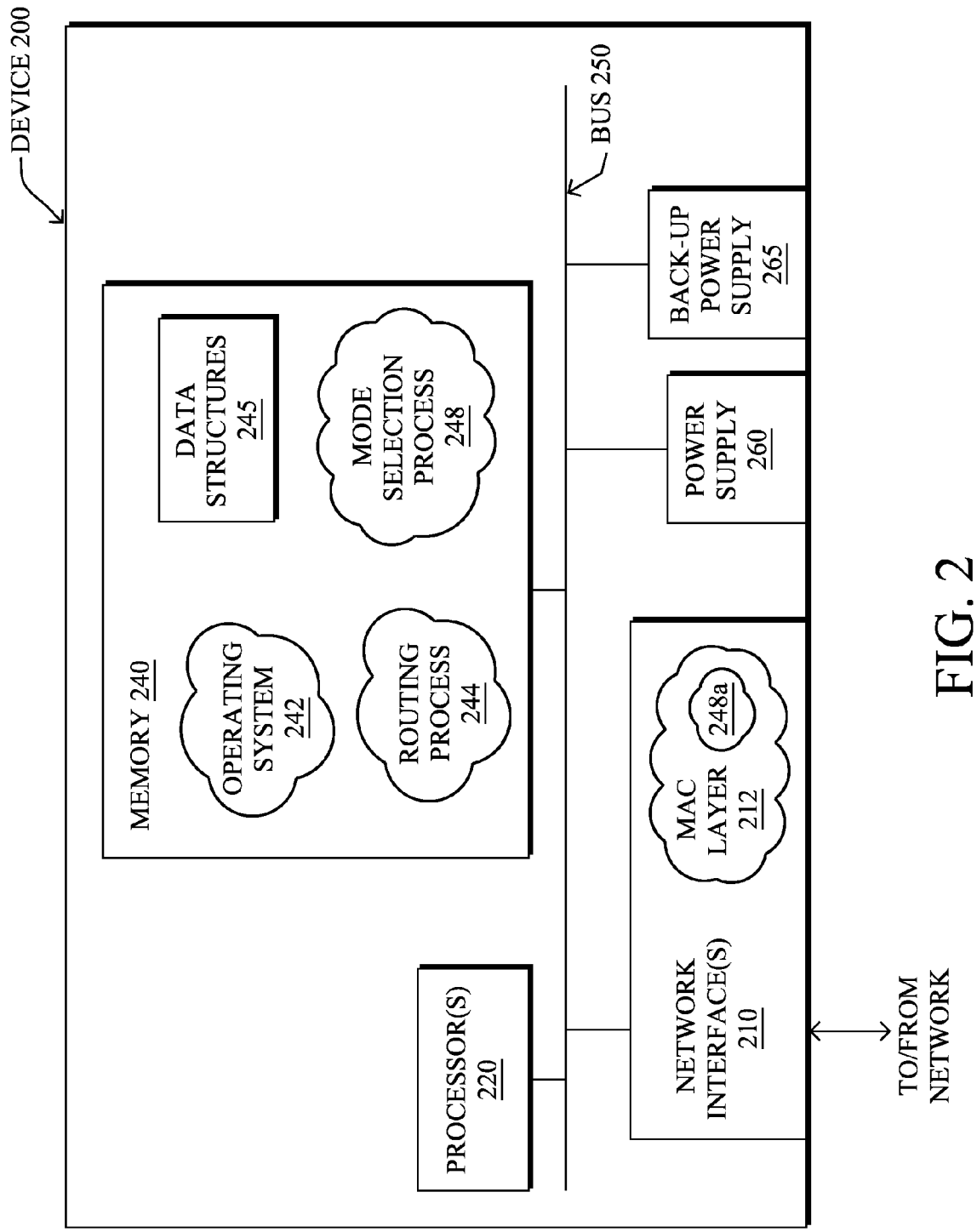
FIG. 2 illustrates an example wireless device/node.

FIG. 2 is a schematic block diagram of an example node/device 200 that may be used with one or more embodiments described herein, e.g., as nodes 11-44. The device may comprise one or more network interfaces 210 (e.g., wireless/frequency-hopping), at least one processor 220, and a memory 240 interconnected by a system bus 250, as well as a main power supply 260 (e.g., plug-in) and a backup power supply 265 (battery, capacitor, etc.).

The network interface(s) 210, e.g., transceivers, contain the mechanical, electrical, and signaling circuitry for communicating data over wireless links 105 coupled to the network 100. The network interfaces may be configured to transmit and/or receive data using a variety of different communication protocols as noted above and as will be understood by those skilled in the art, particularly for frequency-hopping communication as described herein. In addition, the interfaces 210 may comprise an illustrative media access control (MAC) layer module 212 (and other layers, such as the physical or "PHY" layer, as will be understood by those skilled in the art). Note, further, that the nodes may have two different types of network connections 210, namely, wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for is programs/processes operating on the device). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative "mode selection" process 248 as described in greater detail below. Note that while mode selection process 248 is shown in centralized memory 240, alternative embodiments provide for the mode selection process to be specifically operated within the network interfaces 210, such as a component of MAC layer 212 (process "248*a*").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (e.g., a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route is request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Figure 3:
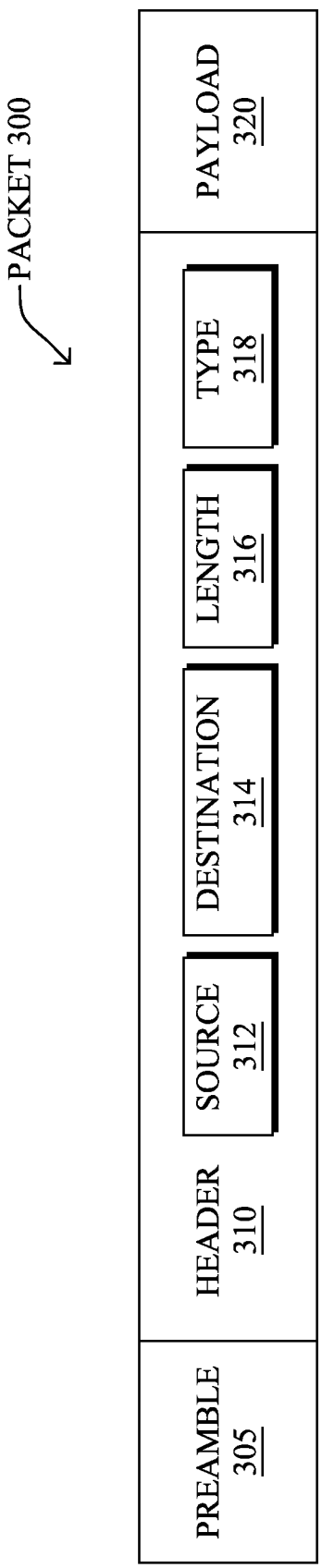
FIG. 3 illustrates an example wireless message/packet.

FIG. 3 illustrates an example simplified message/packet format 300 that may be used to communicate information between devices 200 in the network. For example, message 300 illustratively comprises a header 310 with one or more fields such as a source address 312, a destination address 314, a length field 316, a type field 318, as well as other fields, such as Cyclic Redundancy Check (CRC) error-detecting code to ensure that the header information has been received uncorrupted, as will be appreciated by those skilled in the art. Within the body/payload 320 of the message may be any information to be transmitted, such as user data, control-plane data, etc. In addition, based on certain wireless communication protocols, a preamble 305 may precede the message 300 in order to allow receiving devices to acquire the transmitted message, and synchronize to it, accordingly.

Frequency-hopping, also referred to as "frequency-hopping spread spectrum" (FHSS) or channel-hopping, is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 4A:
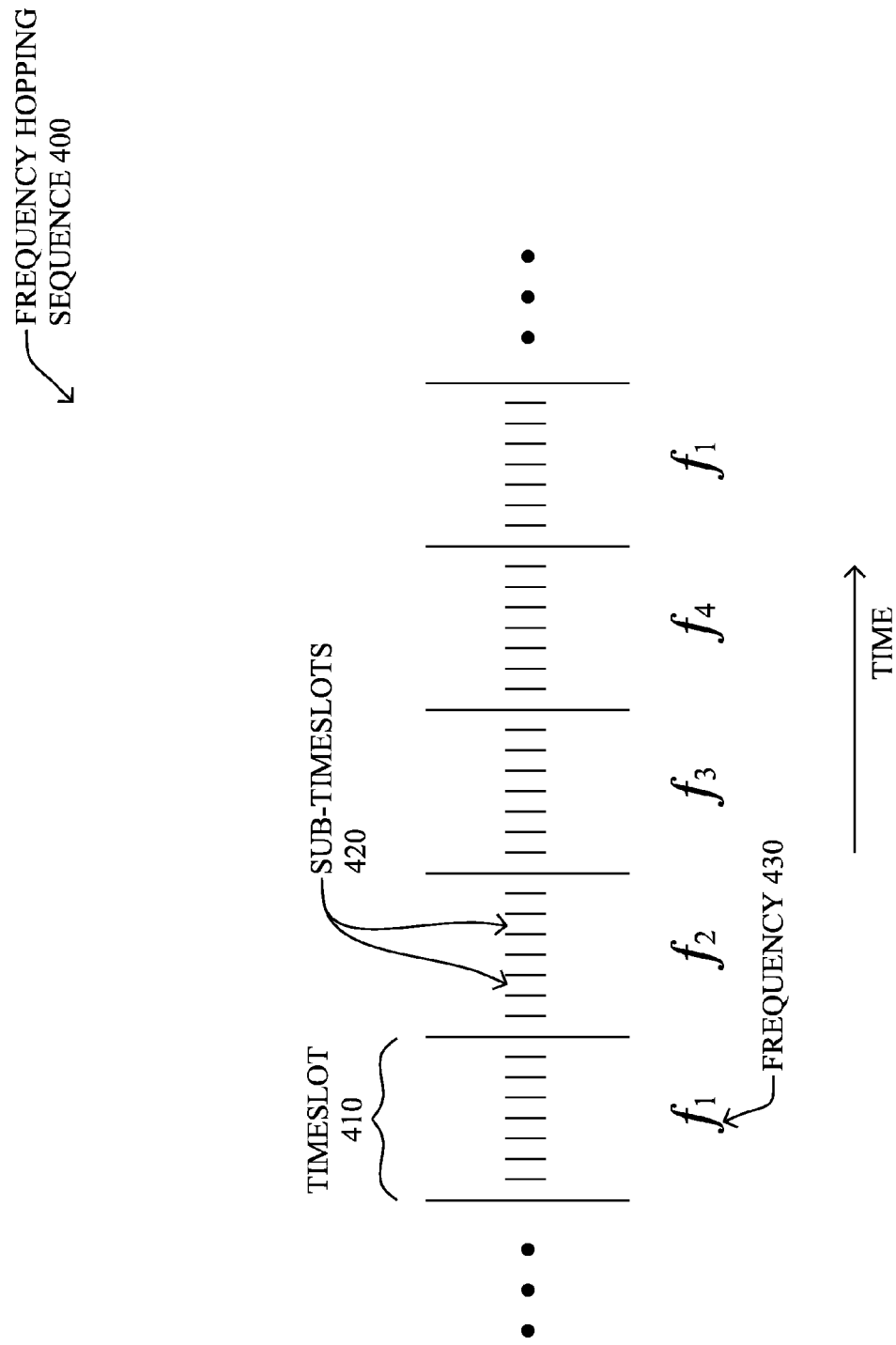
FIGS. 4A-4C illustrate example frequency hopping sequences.

In particular, as shown in FIG. 4A, in frequency-hopping wireless networks, time frames are divided within a frequency-hopping sequence 400 into regular timeslots 410, each one operating on a different frequency 430 (e.g., $f_1$-$f_4$). A reference clock may be provided for the time frames for an entire network (e.g., mesh/cell), or at least between pairs of communicating devices. A MAC layer 212 of each node 200 divides time into timeslots that are aligned with the timeslot boundary of its neighbor. Also, each timeslot 410 may be further divided into sub-timeslots 420. (Note that not all frequency-hopping systems use sub-timeslots, and devices can begin transmission at any time within a timeslot; the view herein is merely one example.) Illustratively, the MAC layer 212 is in charge of scheduling the timeslot in which a packet is sent, the main objective of which generally being randomization of the transmission time in order to avoid collisions with neighbors' packets. Note that the MAC layer 212 must not only schedule the data messages coming from upper layers of a protocol stack, but it also must schedule its own packets (e.g., acknowledgements, requests, beacons, etc.).

Figure 4B:
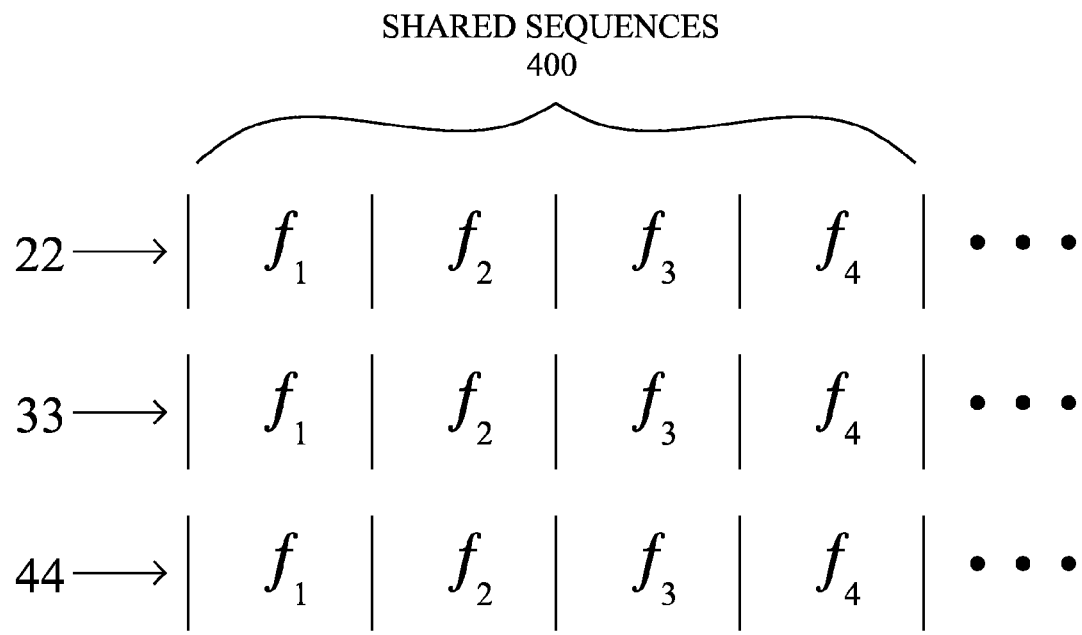

A device in the frequency-hopping network configures its receiver to follow a hopping schedule by picking a channel sequence, duration of each time slot, and time base that defines when the first slot in the schedule begins. To then communicate a packet, the transmitter and receiver must be configured to the same channel during the packet transmission. All devices in a given network may utilize the same hopping schedule (i.e. all devices are configured to use the same channel sequence, time slot duration, and a common time base), resulting in a network where all communication in the network at any given point in time utilizes the same channel. An example of this is shown in FIG. 4B, in which each receiver (22, 33, and 44) are all configured with the same sequence (assume also that node 11 uses the same sequence).

Figure 4C:
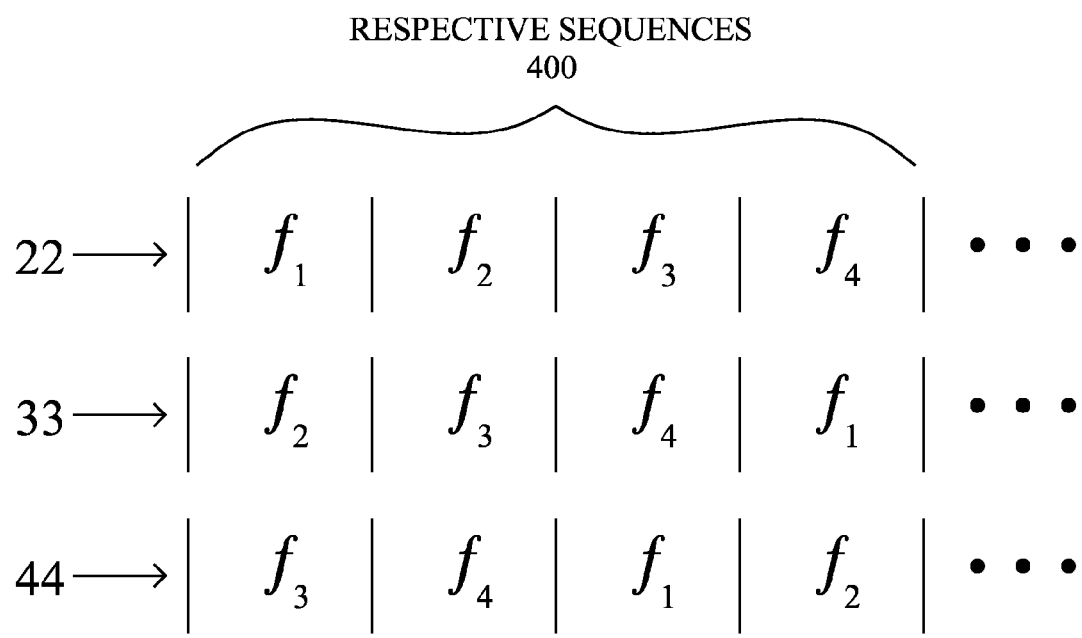

Alternatively, each transmitter-receiver pair may utilize different hopping schedules (i.e., each pair may differ in channel sequence, time slot duration, and/or time base), such that transmitter-receiver pairs may communicate at the same time but on different channels. For instance, each device in the channel hopping network may individually pick their own hopping schedule parameters independent of any other node, as is shown in FIG. 4C. Note that the offset of the frequencies (i.e., the fact that the same four frequencies are used in the same order, just offset by one timeslot) is merely one illustration, and the sequences and frequencies can be independently chosen. Also, note that while timeslots are shown as being synchronized between different nodes, those skilled in the art will appreciate that timeslots between different nodes can, in fact, be out-of-phase, and may have no relationship with each other.

A device synchronizes its hopping schedule with another device by is communicating its channel sequence, time slot duration, and current time within the hopping schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time.

As noted above, because devices in a computer network (e.g., mesh network) may rely on a small source of stored energy (e.g., batteries or a capacitor), it is desirable for those devices to reduce power. In particular, the transceiver, when placed in receive mode, can require significant power and quickly drain a small source of stored energy. This is especially problematic during a power outage of a main power supply, when only a limited lifespan of the backup power (e.g., battery or capacitor) may be used to transmit and/or receive information. There may be other reasons where reduced power is desired, such as in general (all the time), in response to a demand response from a power grid (e.g., to prevent brownouts, blackouts, etc.), or other reasons.

Power Reduction and Latency Minimizing Modes

The techniques described herein provide a system and method that can allow devices to dynamically transition between a mode that minimizes power (by disabling the receiver whenever possible) and a mode that minimizes latency (by enabling the receiver whenever possible) with little overhead. The system and method permits a limited increase in expected communication latency when transitioning to a mode that minimizes power. In particular, supporting both latency-minimizing and power-reduction modes within the same network allows communication between devices with different power requirements in the same network, and adapts to possible changes (expected or unexpected) in a power source for certain devices.

Specifically, according to one or more embodiments of the disclosure as described in greater detail below, in a power reduction mode, a communication device samples a particular frequency hopping sequence during only a particular specified sub-timeslot of a timeslot. If a transmission energy is not detected during the specified sub-timeslot, the is device turns off its receiver for a remainder of the timeslot. Otherwise, it continues to sample the particular frequency hopping sequence for at least one or more additional sub-timeslots of the remainder of the timeslot. According to one or more additional embodiments of the disclosure, a communication device determines whether a neighboring communication device is operating in a first mode (power reduction) or a second mode (latency minimizing). If in the second mode, it transmits a transmission to the neighboring communication device starting at any sub-timeslot of the plurality of sub-timeslots. If in the first mode, it transmits the transmission to the neighboring communication device while ensuring that the transmission is actively energized during a particular specified sub-timeslot.

Illustratively, the techniques described herein may be performed by hardware, software, and/or firmware, such as in accordance with mode selection process 248 and/or MAC layer module 212 (248a), which may each contain computer executable instructions executed by a processor (e.g., processor 220 or an independent processor within the network interface 210) to perform functions relating to the novel techniques described herein, such as, e.g., as part of a frequency hopping communication protocol. For example, the techniques herein may be treated as extensions to conventional wireless communication protocols, such as the 802.11 protocol, WiFi, etc., and as such, would be processed by similar components understood in the art that execute such protocols, accordingly.

Operationally, a communication device (e.g., nodes 11-44) may select between operation in a first "latency-minimizing" mode and a second "power-reduction" mode, illustratively depending upon various triggers or configurations as described herein. To minimize communication latency in the latency-minimizing mode, the devices generally always enable their receivers configured to the channel specified by the hopping schedule, except when switching channels or transmitting packets. In other words, the receivers sample the particular frequency hopping sequence 400 during all non-transmitting sub-timeslots 420. A device can thus initiate transmissions to a latency-minimizing device at any time, since the receiver is enabled nearly all the time. Accordingly, such transmissions may utilize the shortest preamble allowed by the physical layer.

Conversely, to reduce power, the devices utilize a sampling technique that is applied to the same hopping schedule 400 as in the latency-minimizing mode. Specifically, each sample occurs during only a particular specified sub-timeslot 420, e.g., at the beginning of a timeslot 410, using the channel/frequency assigned to the timeslot. When no transmission energy is detected during the specified sub-timeslot, the device disables (turns off) the receiver for the remainder of the timeslot.

Figure 5A:
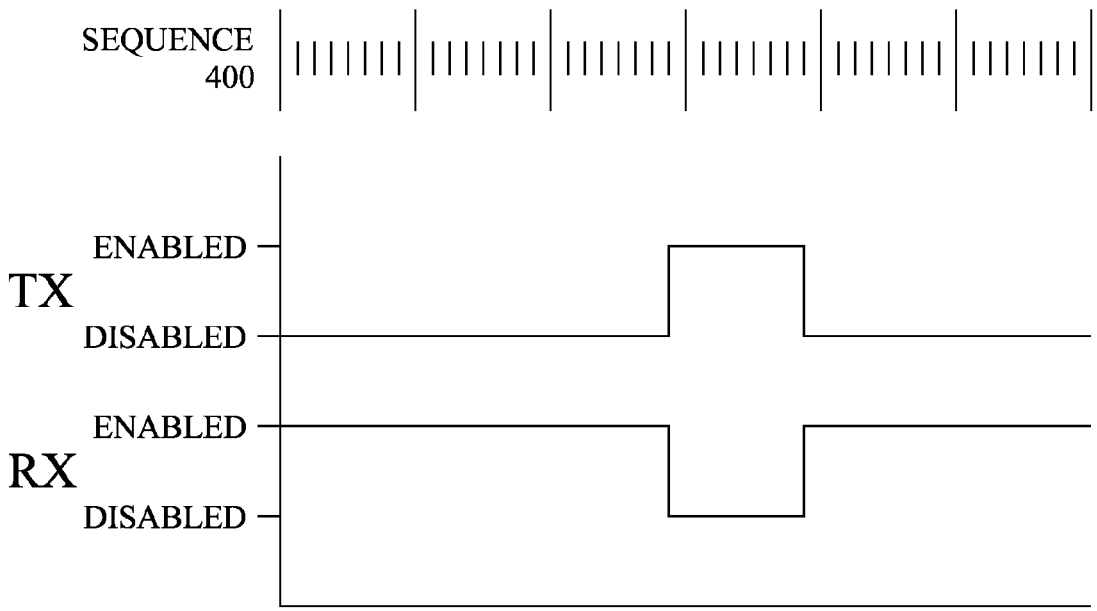
FIGS. 5A-7B illustrate examples of receiver operation.
Figure 5B:
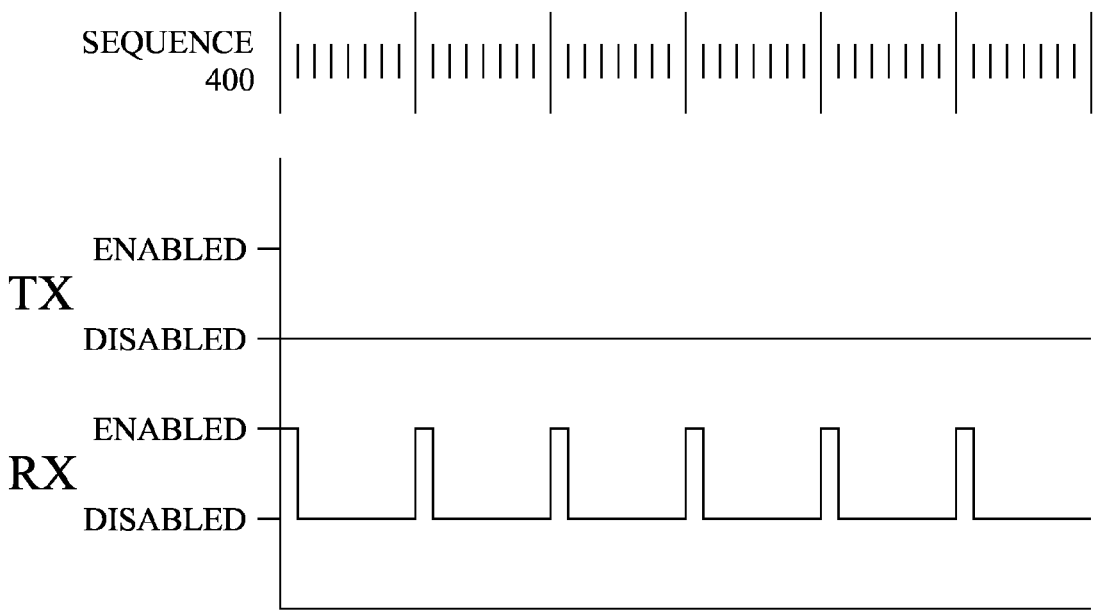

FIGS. 5A and 5B illustrate the differences between the latency-minimizing mode (FIG. 5A) and power-reduction mode (FIG. 5B), where the graphs demonstrate example receiver-enabled timing corresponding to each mode. As can be seen, the receiver is enabled nearly all the time during latency-minimizing mode (unless transmitting), while in power-reduction mode, the receiver is only enabled for a very small percentage of the frequency hopping sequence. FIG. 5B, notably, illustrates the instance where no transmission energy is detected during the sampling periods.

Figure 6A:
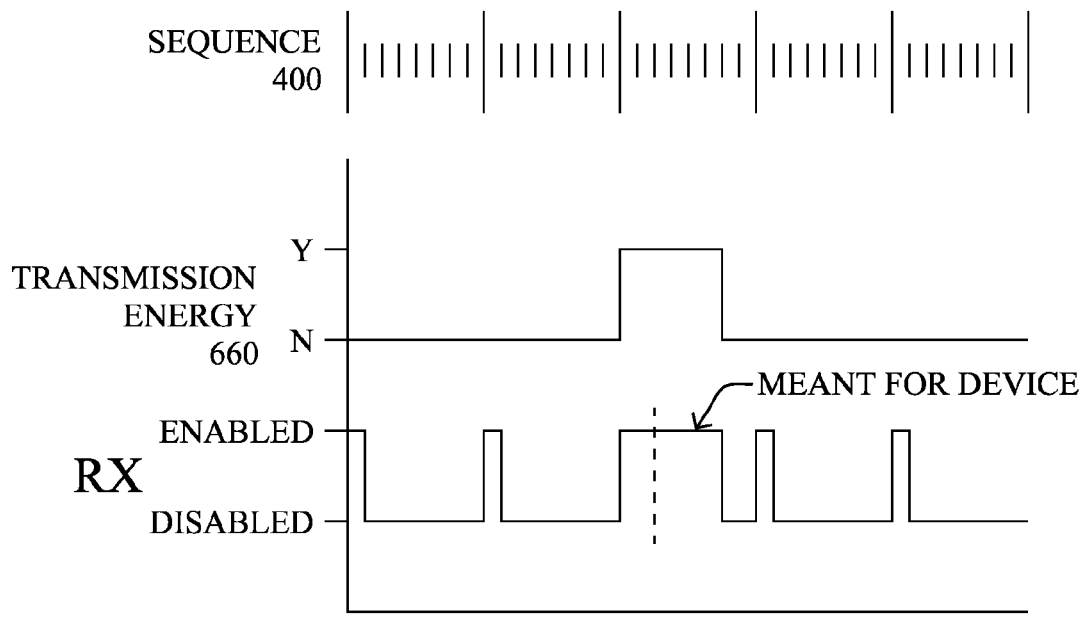

If there is transmission energy detected during a sample, then the receiving device continues to sample the channel for at least one or more sub-timeslots of the remainder of the timeslot. In particular, the receiver may remain active long enough to determine whether the transmission energy is a transmission (message/packet 140) meant for the communication device. For example, FIG. 6A illustrates the occurrence of a transmission energy 660, and the receiver remains enabled. From the receiving node's perspective, when a header 310 of a packet 300 is received, notably before the whole packet needs to have been received, the node (e.g., its MAC layer 212) analyzes the destination address 314 or other indication to determine whether the receiving node is the intended recipient of the packet 300. Illustratively, this analysis may occur after performing an error check on the header of the packet to ensure that the information is error free.

Figure 6B:
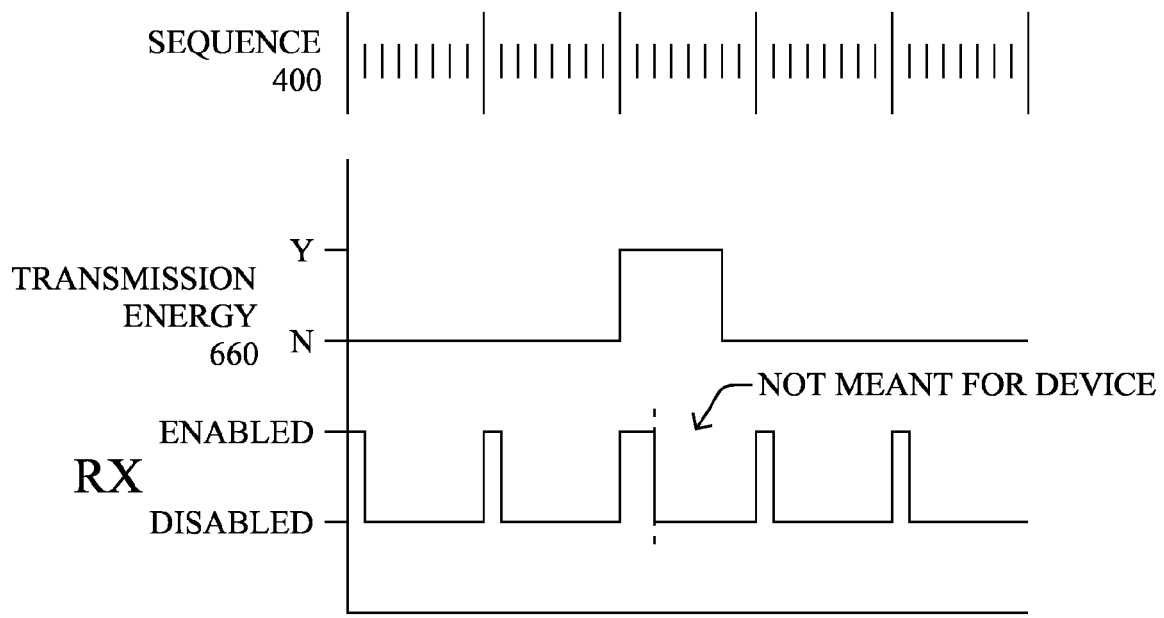

As shown in FIG. 6A, in response to verifying that the receiving node is, in fact, the intended recipient node (e.g., that the destination address corresponds to the wireless node), then the receiver may remain enabled (be kept on) for the duration of the transmission (e.g., based on length field 314, or for the duration of a standard packet, or for the remainder of the timeslot, etc.). Otherwise, if it is determined that the destination address corresponds to another wireless node, i.e., that the transmission is not meant for the communication device, then the receiver may turn off and ignore the remainder of the packet (e.g., payload 320), as shown in FIG. 6B.

By using the channel sampling technique, a device can achieve a small receiver duty cycle while only increasing expected latency to T/2, where T is the timeslot duration. For example, a typical system available today can perform a channel sample in less than 400 us, thus achieving about 0.3% duty cycle and 62.5 ms expected latency with a time slot duration of 125 ms. Further duty cycle reduction (and expected latency increase for communication) is possible by disallowing communication during a subset of slots.

Note that according to the techniques herein the channel sequence and timing are still known and active, i.e., the network stack of a node/device remains "awake" (unlike sleep timers). That is, using the same hopping schedule 400 in both modes allows devices to transition between latency-minimizing and power-reduction mode while allowing channel schedule information synchronized with other devices to remain valid, minimizing the complexity and cost of transitioning between modes.

Figure 7A:
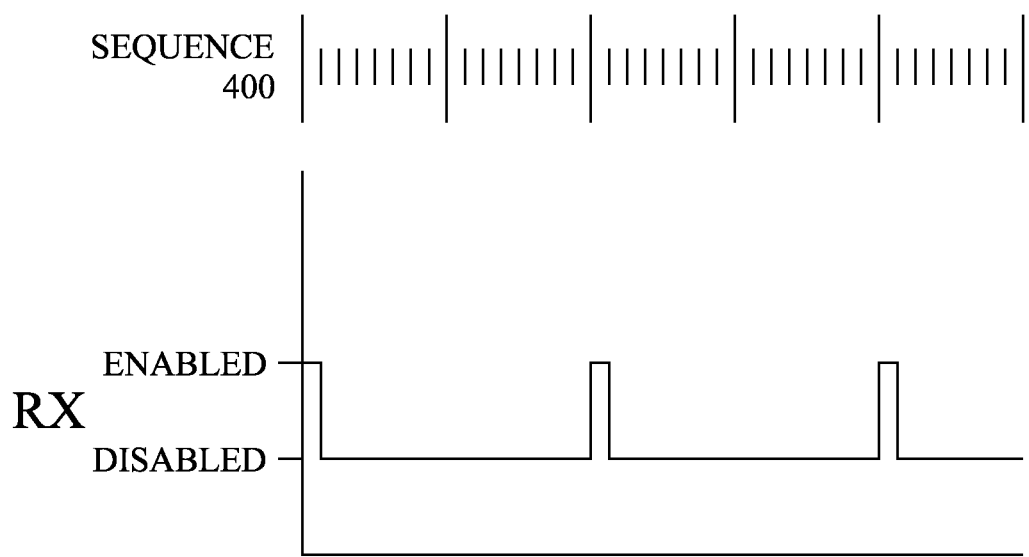
Figure 7B:
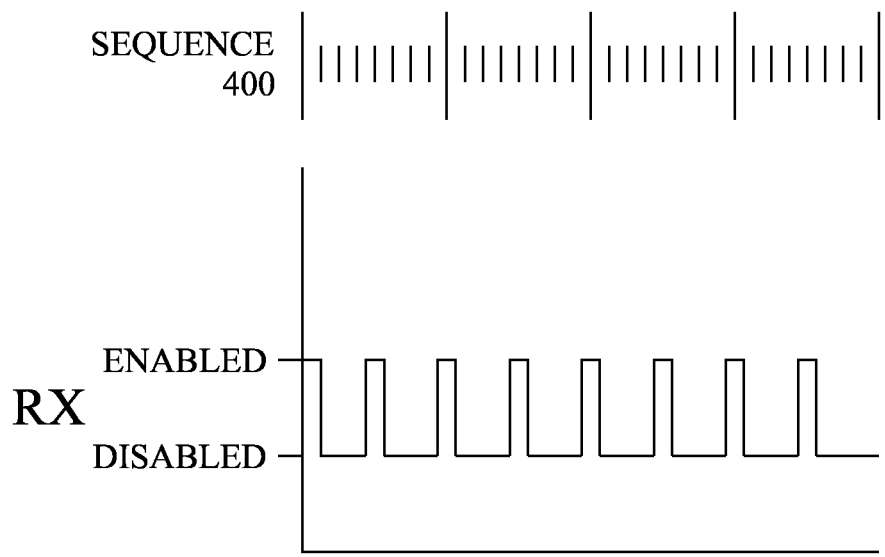

While the sampling technique is shown based on a single sub-timeslot 420 in each timeslot (e.g., an initial sub-timeslot of each timeslot), the techniques herein may also utilize other arrangements. For example, as shown in FIG. 7A, a particular sub-timeslot of only certain timeslots (e.g., every other timeslot) of the particular frequency hopping sequence may be used to further reduce power consumption. In this instance, certain provisions may be made to ensure that communicating devices knew which particular timeslots carried the specified sub-timeslots for active power-reduction communication. Also, as shown in FIG. 7B, the number of sub-timeslots specified for receiver activity may be increased, thus lessening the power reduction, but also decreasing the associated latency. As shown in FIG. 7B, for example, two sub-timeslots are used during each timeslot, accordingly.

A device may quickly and deterministically switch to power-reduction mode, and vice versa, and for each switch maintains the same frequency hopping sequence, only changing the sampling rate. Note that a device may proactively notify/inform other neighboring devices of its current mode, such as by using a synchronization message or piggybacking such information in other outgoing data packets. Alternatively (or in addition), a device may reactively notify other devices of its current mode by sending such information only in response to receiving a packet from those devices (e.g., in an acknowledgement message having the indication piggybacked therein). This reactive mode is also useful for notifying those devices that did not receive any proactive announcements in the case one or more were sent. As a still further alternative, no notification may be sent, and any devices wishing to transmit a message to the receiving device may be forced to make a determination intrinsically, such as described below.

In accordance with one or more embodiments herein, a device may transmit messages toward another device in the network 100 based on whichever mode the intended recipient device is currently operating. In particular, a transmitting device may determine that a neighboring communication device is operating in the power-reduction mode or the latency-minimizing mode in response to receiving an explicit indication within a message received from the neighboring communication device that informs the communication device of the mode in which the neighboring communication device is operating.

Figure 8A:
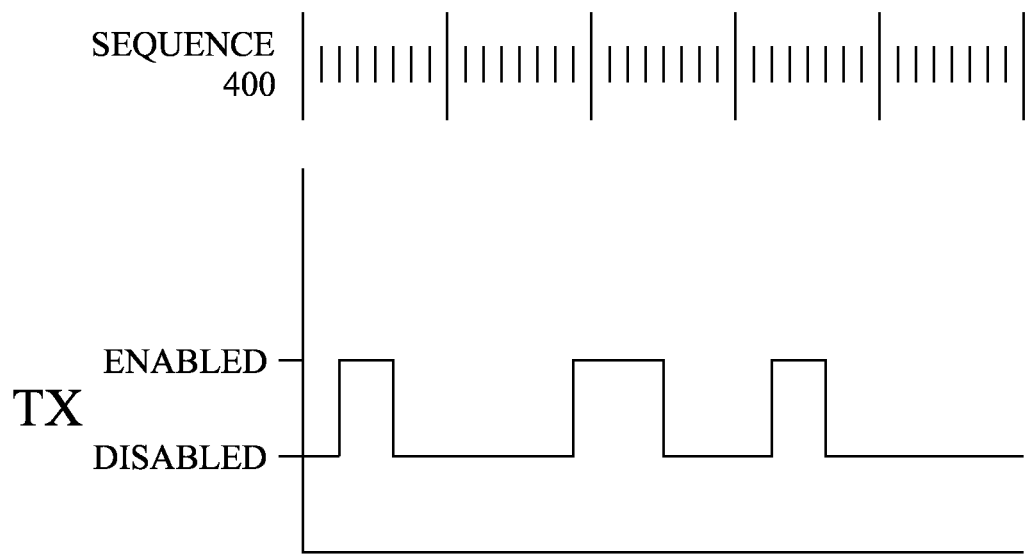
FIGS. 8A-8B illustrate examples of transmitter operation.
Figure 8B:
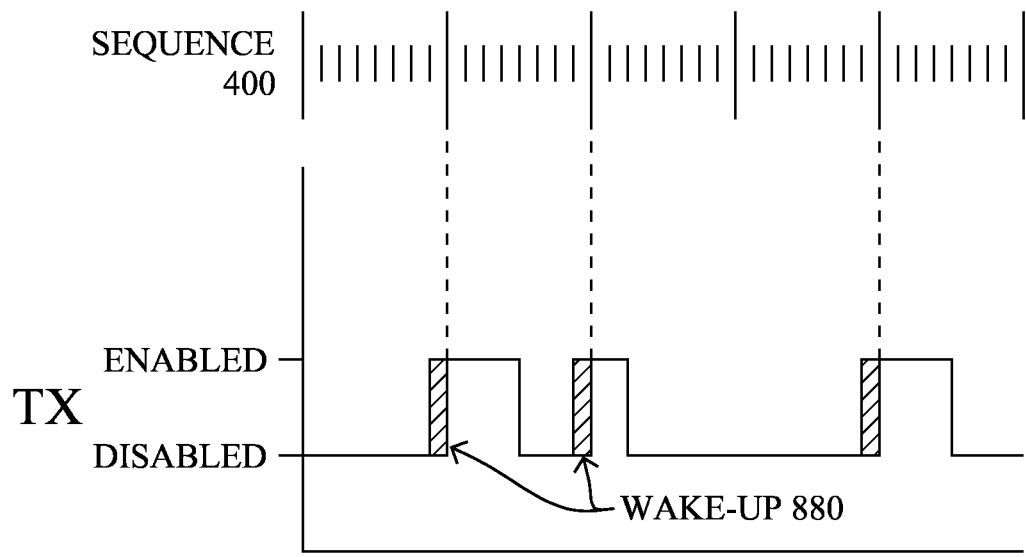

In response to determining that the neighboring communication device is operating in the latency-minimizing mode, transmissions may be sent (transmitted) to the neighboring communication device starting at any sub-timeslot 420 of a timeslot 410, as illustrated in FIG. 8A. Conversely, in response to determining that the neighboring communication device is operating in the power-reduction mode, the transmission to the neighboring communication device must ensure that it is actively energized during the particular specified sub-timeslot (e.g., an initial sub-timeslot), as illustrated in FIG. 8B. For instance, as shown in FIG. 8B, one or more "wake-up messages" 880 may precede the actual transmission 660 in order to account for any possible clock-drift of the intended receiver. Specifically, a device can initiate transmissions to a power-reducing device only during the specified sub-timeslot 420, and the transmission generally consists of a short preamble (e.g., wake-up messages 880 and/or packet preamble 305) followed by the data packet 300/140 (transmission 660). Because time is synchronized, the preamble is sized to account only for the expected error in time synchronization (e.g., clock-drift) between the transmitter and receiver.

Note that a device can transition from the power-reduction mode to latency-minimizing mode at any time. Packet transmissions from transmitting devices unaware of the transition will still be received, however, since the receiver is still enabled at the same times and channels as in the power-reduction mode. That is, if the transmission is sent such that it is received in the specified sub-timeslot of the power-reduction mode, then if the receiver is in the latency-minimizing mode, the receiver is still active during this sub-timeslot, and the transmission may still be received. However, a device can also transition from the latency-minimizing mode to power-reduction mode at any time. In this instance, unless an explicit notification is sent out by the receiving node, messages may go unheard by the receiving node if not sent during the specified sub-timeslot. In other words, packet transmissions from other devices unaware of the transition will not be received unless they happen to be sent during the specified sub-timeslot (e.g., at the beginning of a timeslot) where a channel sample occurs.

Figure 9:
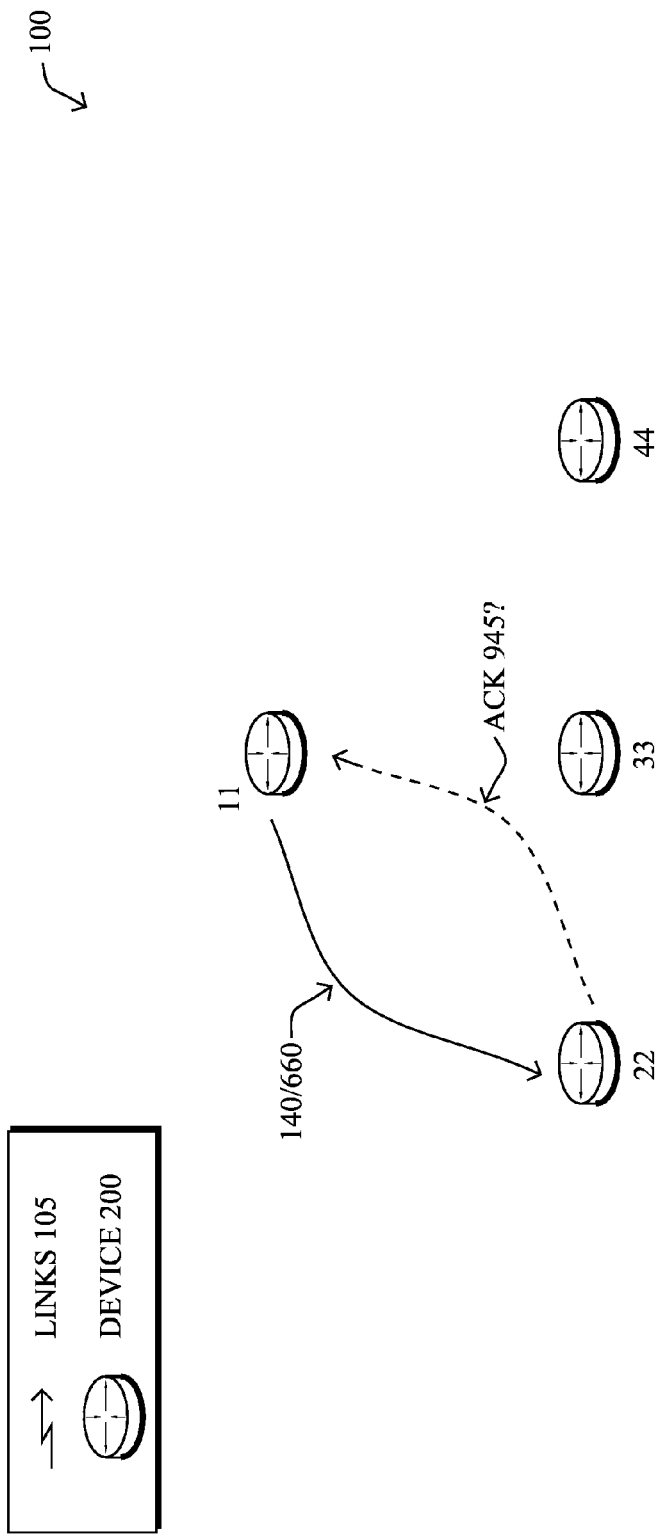
FIG. 9 illustrates an example message exchange.

In accordance with one or more embodiments herein, therefore, though the neighboring communication device (receiving node) can be assumed to be in the latency-minimizing mode as a default ("normal") mode, if there is a lack of acknowledgement 945 received from the neighboring communication device for a particular communication (message 140/660), as shown in FIG. 9, then the transmitting device may attempt subsequent transmissions under the assumption that the receiving device has transitioned to operate in a power-reduction mode. (Alternatively, a plurality of unacknowledged transmissions may be tolerated before assuming the intended receiver is in power-reduction mode.) If, after further transmissions in the power-reduction mode, it is determined that acknowledgements are still not received, then the device may no longer is be reachable, and may thus be declared unreachable, accordingly.

It is important to note that the techniques herein do not merely reduce power by having receivers listening to only a portion of a timeslot 410. Indeed, the techniques herein have transmitters precede data transmissions with wakeup packet transmissions, and as a result, does not require the listener (receiving device) to remain active for a duration that accounts for any clock drift or time synchronization error. That is, because the techniques herein uses wakeup packets, it shifts the cost of handling clock drift/sync errors to the transmitter. The assumption is that transmissions occur less frequently (there will inevitably be times where a receiver wakes up to listen and there is nothing to receive) and this is a particularly useful tradeoff. The receiver (radio) may thus be enabled just long enough to sample energy and immediately be turned off if no energy is detected.

Furthermore, the techniques herein make no assumption that transmission slots never overlap between devices in close proximity in order to avoid collisions. In particular, the techniques herein allow for the use of mechanisms to resolve contention between multiple transmitters by randomizing the number of wakeup packets to transmit before a data packet. In this manner, the transmitters can effectively choose a random transmission start time to and utilize standard CSMA/CA (carrier sensing) techniques help avoid collisions.

Figure 10A:
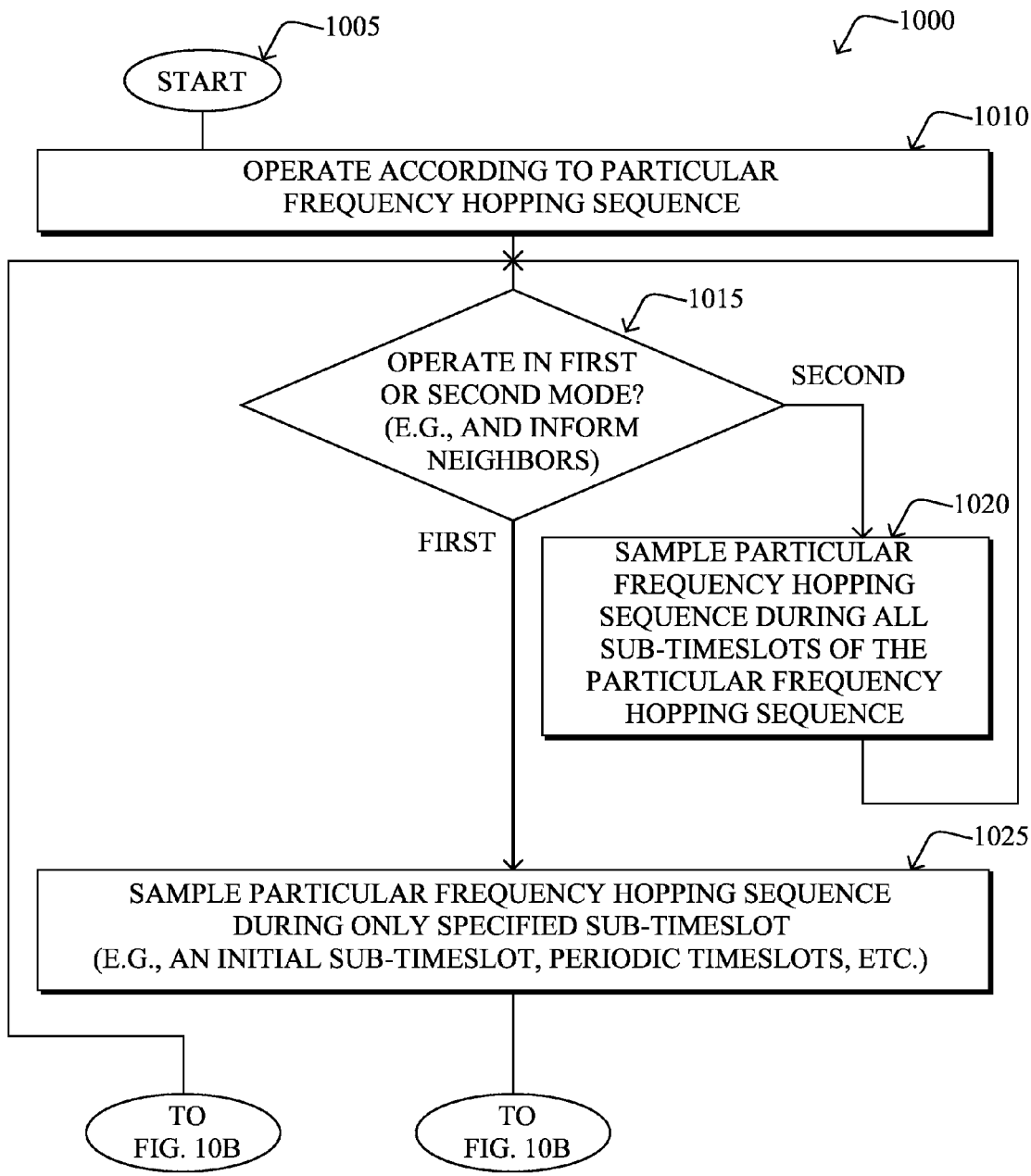
FIGS. 10A-10B illustrate an example simplified procedure for reduced power consumption in frequency hopping computer networks, e.g., from the perspective of a node when receiving transmissions.
Figure 10B:
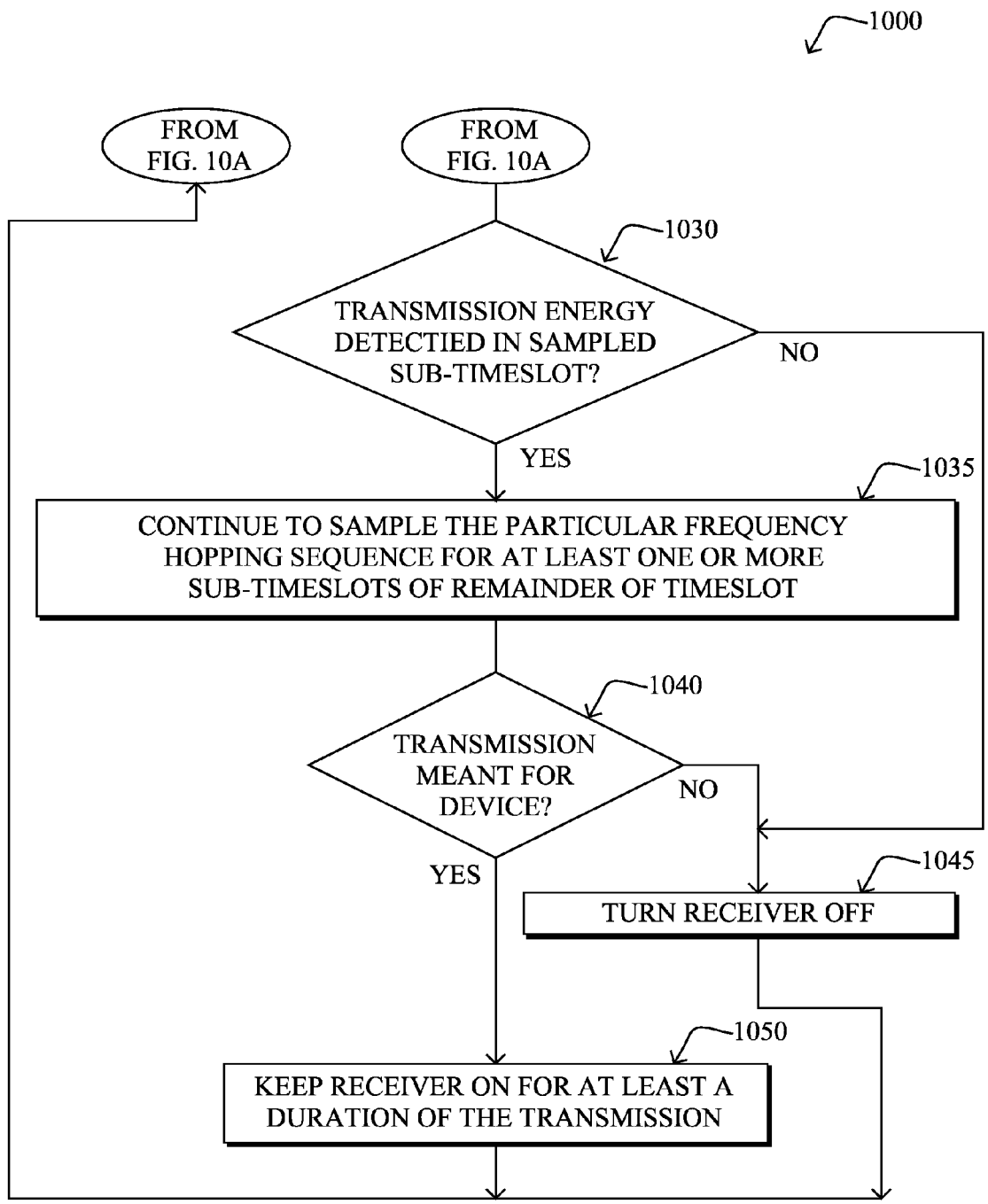

FIGS. 10A-10B illustrate an example simplified procedure for reduced power consumption in frequency hopping computer networks in accordance with one or more embodiments described herein, e.g., from the perspective of a node when receiving transmissions. The procedure 1000 starts at step 1005, and continues to step 1010, where the node is operating according to particular frequency hopping sequence 400 in general, as described above. Upon determining in step 1015 that the node is in the second mode (normal mode or latency-minimizing mode), then in step 1020 the node samples the frequency hopping sequence during all sub-timeslots 420 of the particular frequency hopping sequence 400. (Note that in step 1015, the node may also be configured to inform/notify its neighbors as to its current mode of operation.)

If, on the other hand, the node in step 1015 is operating in the second mode (power reduction or power-outage mode), then in step 1025 the node configures itself (e.g., MAC layer 212) to sample the particular frequency hopping sequence 400 during only a specified sub-timeslot 420 of a timeslot 410, such as, e.g., an initial sub-timeslot, periodic timeslots, etc., as noted above. If in step 1030 there is transmission energy 660 detected in sampled sub-timeslot, then the device continues to sample the particular frequency hopping sequence in step 1035 for at least one or more sub-timeslots of the remainder of the timeslot 410, e.g., long enough to determine in step 1040 whether the transmission 660 was meant for the node/device. If there is no energy in step 1030, or if the transmission is not meant for the node in step 1040, then the receiver 210 is turned off in step 1045, until the next sample period. Conversely, if the transmission is intended for the receiving node in step 1040, then the receiver is kept on in step 1050 for at least a duration of the transmission (e.g., based on the length of a packet or other known or determinable length of time).

Figure 11:
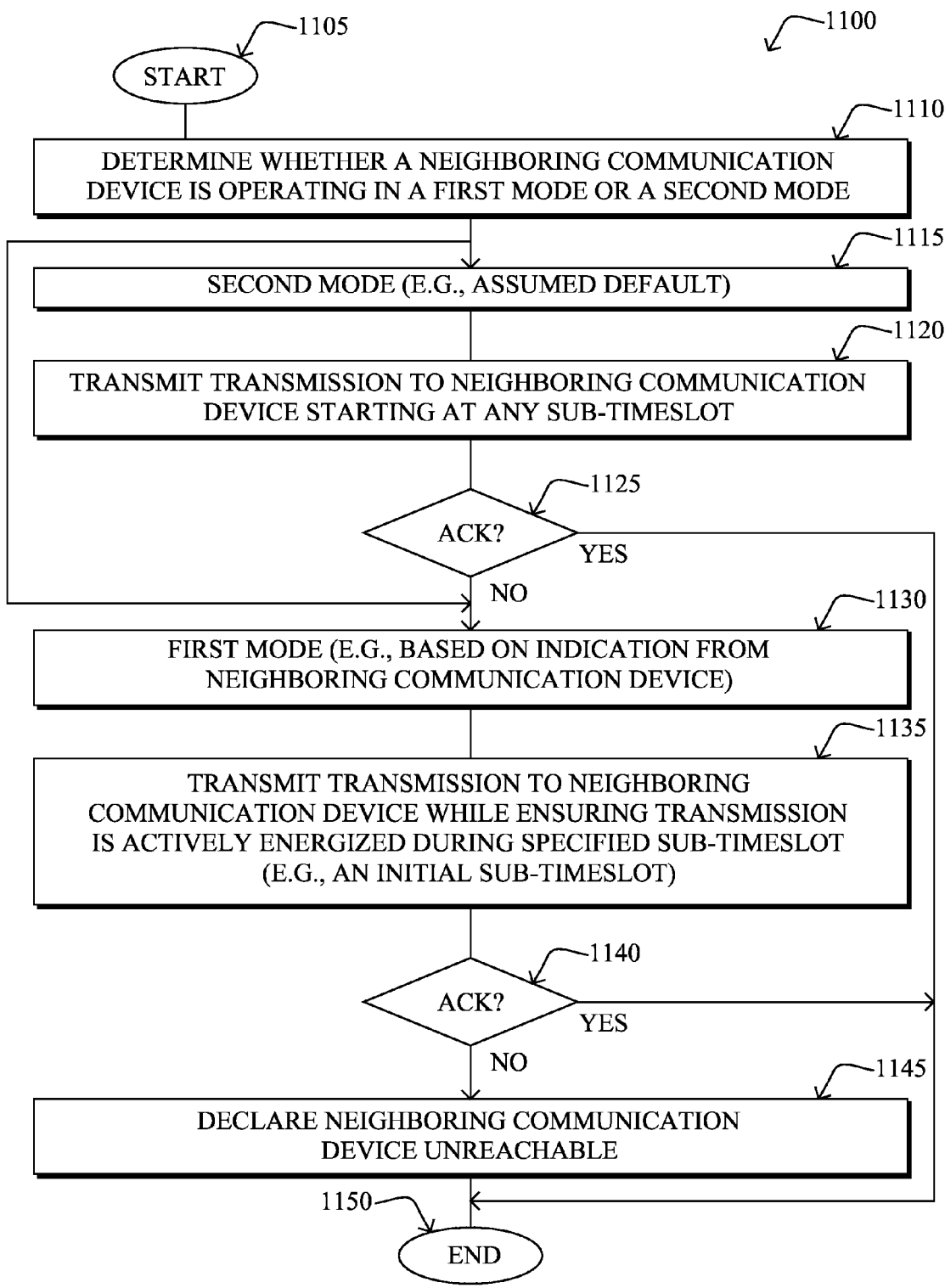
FIG. 11 illustrates another example simplified procedure for reduced power consumption in frequency hopping computer networks, e.g., from the perspective of a node when transmitting.

In addition, FIG. 11 illustrates another example simplified procedure for reduced power consumption in frequency hopping computer networks in accordance with one or more embodiments described herein, e.g., from the perspective of a node when transmitting transmissions. The procedure 1100 starts at step 1105, and continues to step 1110, where the node determines whether a neighboring communication device is operating in a first mode (power-reduction mode) or a second mode (latency minimization or normal mode). If in the second mode in step 1115 (e.g., an assumed default mode), then in step 1120 the node may transmit a transmission 660 (e.g., packet 140) to a neighboring communication device starting at any sub-timeslot 420 of the frequency hopping sequence 400. If there is no acknowledgment ("ACK") in step 1125 (or given number of ACKs), then the node may determine or assume that the neighboring communication device is in the first mode (power-reduction mode) in step 1130.

If it is determined/assumed that the neighboring communication device is in the first mode of operation in step 1130, e.g., based on an indication from neighboring is communication device or based on no ACK messages in step 1125, then any transmissions may be transmitted in step 1135 to the neighboring communication device while ensuring that the transmission is actively energized during a particular specified sub-timeslot 420, e.g., the first sub-timeslot. For instance, as described above, a series of wake-up messages 880 may precede the actual transmission 660, such as to account for any clock drifting by the neighboring device. If there is still no ACK (or given number of ACKs) in step 1140 for the transmission in the power-reduction specified sub-timeslot, then in step 1145 the neighboring communication device may be declared unreachable.

The procedure 1100 ends in step 1150, notably with the ability to return to continue transmitting further transmissions/packets, or else to make updated determinations as to whether a particular neighboring communication device is in the first or second mode of operation.

It should be noted that while certain steps within procedures 1000-1100 may be optional as described above, the steps shown in FIGS. 10-11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1000-1100 are described separately, certain steps from each procedure may be incorporated into each other procedure, and the procedures are not meant to be mutually exclusive.

The novel techniques described herein, therefore, provide for different receive modes in a frequency hopping network. By allowing a receiver to sample only select portions of a frequency hopping sequence, devices may enter into a power-conservative mode, whether in response to a loss of primary power, or simply to conserve energy resources, generally, as described above. In addition, the techniques herein maintain a reduced preamble length during the power-reduction mode by utilizing the same time synchronization used in the frequency hopping sequence, and also alleviate costly resynchronization of the hopping schedule with other devices by using the same hopping schedule in both modes.

In addition, the techniques herein provide an efficient balance between power conservation and communication latency by switching between modes of operation. In particular, by merely disallowing communication during a subset of slots in the hopping schedule is problematic because doing so also greatly increases the expected communication latency. For instance, if the system disallows communication in all but one sub-timeslot in a period with N sub-timeslots, while the system would be able to achieve an average duty-cycle of 1/N, the expected communication latency would be $(N-1)*T/2$, where T is the timeslot duration. For example, achieving a 1% duty-cycle would increase the expected latency to nearly 50 timeslots. Using the techniques herein, therefore, reduce the duty-cycle at certain times (e.g., when power reduction is desired or necessary), and reduce the latency at other times.

For example, as mentioned briefly above, the techniques herein are particularly useful in response to power outages, such as to ensure that the power reduction allows for as many (often critical) messages as possible to be transmitted and/or received before backup power is completely lost. Specifically, for Smart Grid AMI applications, handling power outage scenarios reliably and effectively is a challenging problem. Existing mesh-networking solutions that support AMI applications provide some capability to report power outage events. For example, devices may broadcast a Power Outage Notification (PON) or "Last Gasp" message in hopes of communicating the event to a neighboring device that is still powered.

Using the proper low-power hardware/software designs, such as that described above, it is possible to extend the lifetime of a meter from minutes to hours. For example, the above mechanisms allow a device to provide networking functions even while reducing its listening duty-cycle to 1% or less by trading extended lifetime for reduced channel capacity. However, the ability to maintain a network provides the following advantages:

1) Power Outage Notifications can utilize unicast communication, making them more efficient and reliable than when using broadcast communication;
2) Devices experiencing a power outage can receive and forward Power is Outage Notifications from devices that are not within transmission range of a powered device;
3) Network restoration messages can be communicated with lower latency, since devices continue to maintain link-layer synchronization with neighbors and a routing topology; and
4) The network remains connected, whereas it may become disconnected if devices experiencing a power outage stop networking functions. In addition to providing additional information of exactly which devices are experiencing a power outage, network restoration notifications can be communicated even when power to critical parts of the network has not been restored.

The techniques described above specifically allow a device to switch between a mode that is fully capable and maximizes channel capacity to a mode that reduces power consumption with reduced channel capacity. Below, an illustrative example of how a device uses the mechanisms to support a power outage scenario is described, i.e., a method that allows portions of the network affected by a power outage event to switch into a power-reduced mode and continue to maintain the network.

Figure 12:
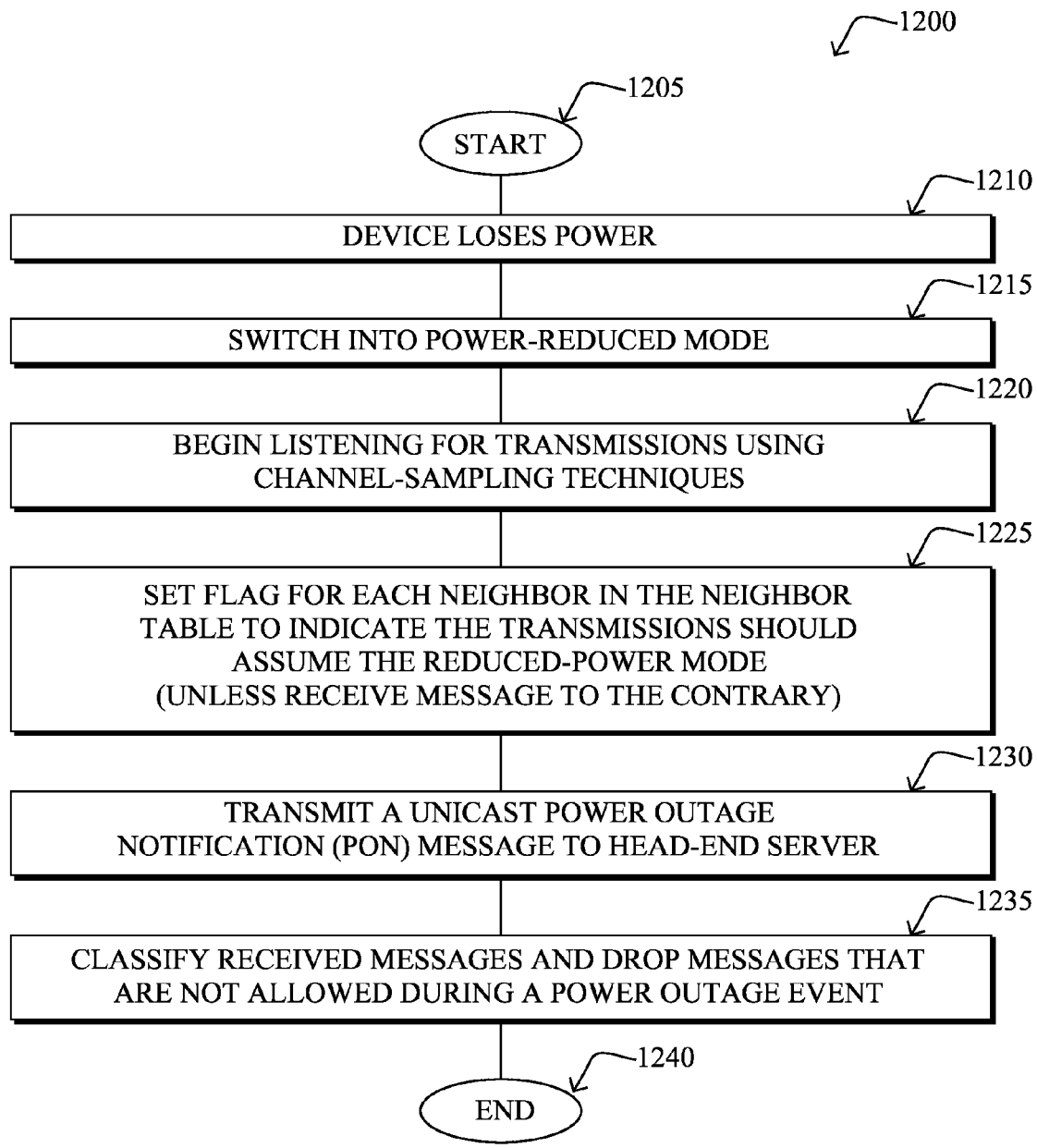
FIG. 12 illustrates an example simplified procedure for node operation when the node loses power.

FIG. 12 illustrates an example simplified procedure for node operation when the node loses power. The procedure 1200 starts at step 1205, and continues to step 1210, where a device 200 experiences a power outage, and in step 1215 immediately switches into a power-reduced mode as described above to perform the following functions:

Step 1220—Begin listening for transmissions using channel-sampling techniques. In doing so, the device significantly reduces the power required to listen for and receive messages.

Step 1225—Optionally set a flag for each neighbor in a neighbor table to indicate that transmissions should assume the reduced-power mode. This conservative behavior assumes that power outage events are spatially correlated and minimizes wasted energy when erroneously assuming that a neighbor is in fully capable mode. Note that a device in fully capable mode will still receive is messages sent to it using power-reduced mode. When receiving a positive indication from a neighbor that it is in fully capable mode, the device can reflect that state in the neighbor table. (The indication may be included in any link data or acknowledgment packet transmitted by that neighbor.)

Step 1230—Transmit a unicast Power Outage Notification (PON) message to the head-end server. Because all devices experiencing a power outage can continue to receive and forward messages, devices can continue to route messages as they did before.

Step 1235—Classify received messages and drop messages that are not allowed during a power outage event. Because the network is operating with reduced channel capacity, some traffic may be dropped to conserve energy or channel capacity. The classes may utilize the DSCP field in an IP packet. (Class assignment is application specific.)

The procedure 1200 then illustratively ends in step 1240, such as in response to regaining power, or in response to losing all backup power and operational capabilities.

Figure 13:
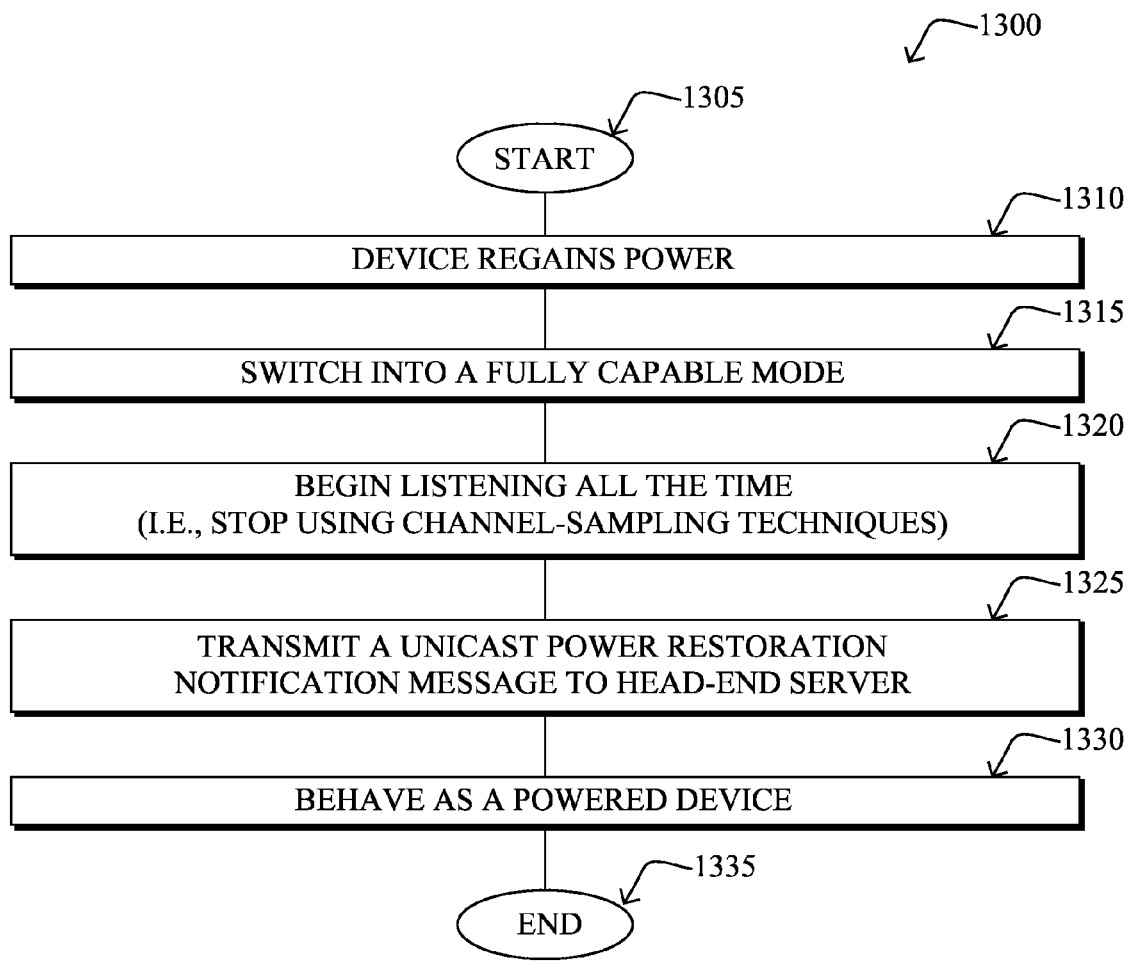
FIG. 13 illustrates an example simplified procedure for node operation when the node regains power.

For example, FIG. 13 illustrates an example simplified procedure for node operation when the node regains power. The procedure 1300 starts at step 1305, and continues to step 1310, where the node experiences a power restoration, and immediately switches into a fully capable mode in step 1315 to performs the following functions:

Step 1320—Begin listening all the time (i.e., stop using channel-sampling techniques) to increase the channel capacity.

Step 1325—Transmit a unicast Power Restoration Notification message to the head-end server. Because all devices experiencing a power outage can continue to receive and forward messages, devices can continue to route messages as they did before.

Step 1330—The node then begins to behave as a powered device, which is described below with reference to FIG. 14. Note that the node in the illustrative embodiment does not make any changes to the neighbor table due to a power restoration. Instead, it relies on positive indication that a neighbor has restored power.

Figure 14:
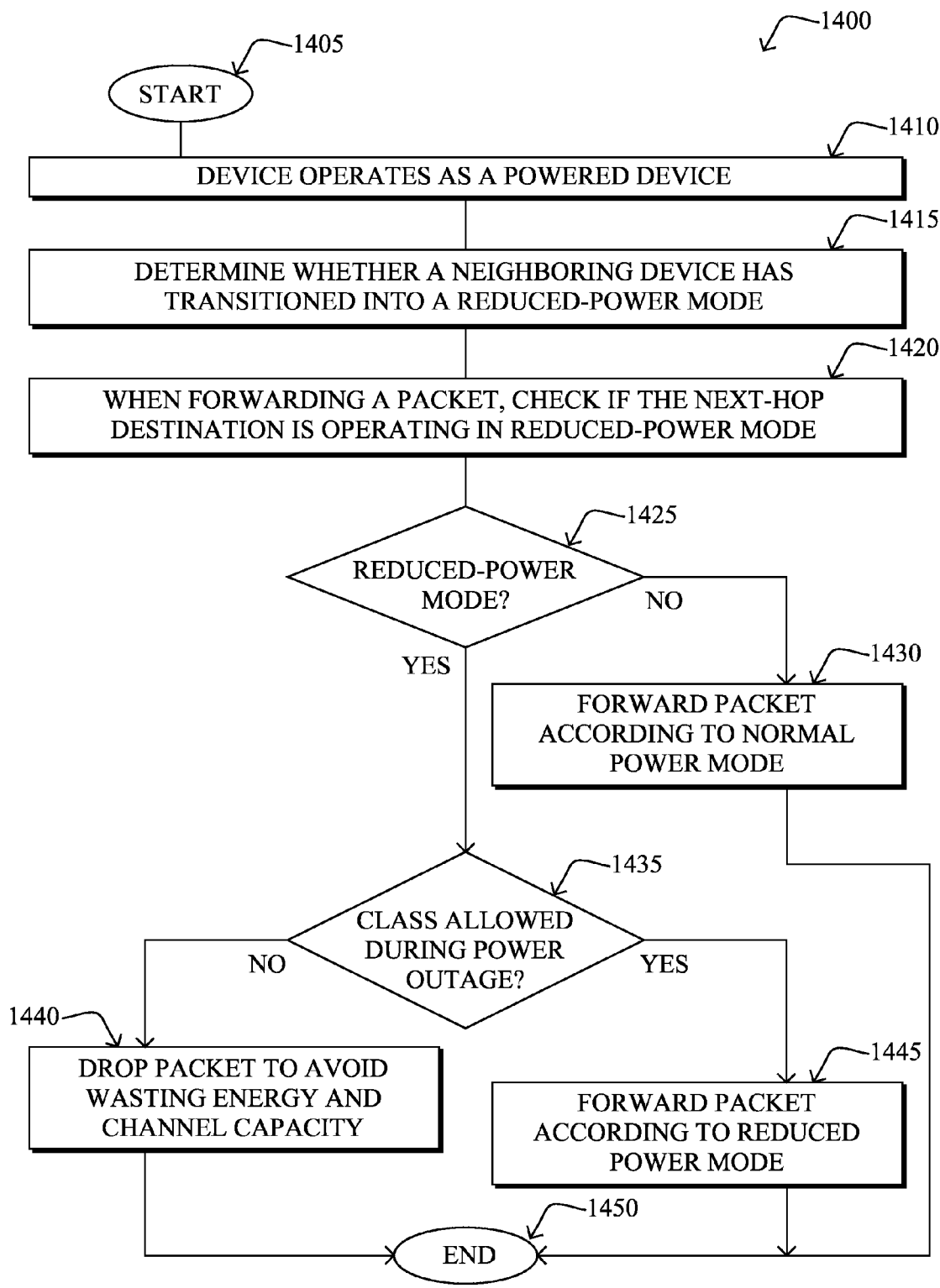
FIG. 14 illustrates an example simplified procedure for node operation when the node is powered.

The procedure 1300 then ends in step 1335, where the node has restored power, and proceeds to operate as a powered node according to procedure 1400 of FIG. 14.

Specifically, FIG. 14 illustrates an example simplified procedure for node operation when the node is powered. The procedure 1400 starts at step 1405, and continues to step 1410, where the node becomes operational in a powered state. Note that nodes/devices that are unaffected by the power outage must receive explicit notification from devices that have switched into a reduced-power mode. The behaviors of powered devices that support the reduced-power mode are as follows:

Step 1415—Determine that a neighboring device (next-hop destination) has transitioned into reduced-power mode: 1) when the number of consecutive unicast transmissions that fail to receive an acknowledgment exceeds a threshold, or 2) when receiving the first positive indication that a device has transitioned into a reduced-power mode. Note that a flag may be set for each neighbor in the neighbor table to indicate that transmissions should assume the reduced-power mode. This conservative behavior assumes that power outage events are spatially correlated and ensures that it can transmit messages to a power outage device. A device in reduced-power mode will include a flag in its link frames to indicate that it is operating in reduced-power mode. When receiving a positive indication from a neighbor that it is in fully capable mode, the device can then reflect that state in the neighbor table. (The indication may be included in any link data or acknowledgment packet transmitted by that neighbor.)

Step 1420—When forwarding a datagram, check if the next-hop destination is operating in reduced-power mode. The determination result reflected in step 1425.

Step 1430—Perform normal forwarding when the next-hop is not in power is reduction mode.

Step 1435—If the next-hop is in power reduction, first determine whether the packet is in a class not allowed for forwarding during a power outage event (e.g., based on type field 318, such as whether the message is a PON, or other critical data).

Step 1440—If not allowed in step 1435, then drop the packet to avoid wasting energy and channel capacity for the reduced-power device.

Step 1445—If allowed in step 1435, then forward the packet according to the reduced power mode.

The procedure 1400 ends in step 1450, notably with the ability to return to an appropriate step above, such as when new packets are received for forwarding, or else when new notifications are received, etc.

Again, it should be noted that while certain steps within procedures 1200-1400 may be optional as described above, the steps shown in FIGS. 12-14 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1200-1400 are described separately, certain steps from each procedure may be incorporated into each other procedure, and the procedures are not meant to be mutually exclusive.

A system in accordance with this illustrative embodiment, therefore, continues to operate the network in a reduced-power mode during a power outage event. Specifically, this is achieved by: 1) a power-outage device using channel-sampling techniques to reduce power and increase lifetime while listening and receiving messages, 2) a power-outage device assuming that its neighbors have switched into a reduced-power mode due to spatial locality of power outage events, 3) a powered device assuming that its neighbors have switched into a reduced-power mode after receiving positive indication that at least one neighbor has switched into a reduced-power mode due to spatial locality is of power outage events, 4) a power-outage device dropping all received messages that are not allowed for forwarding during a power outage event to reduce power and channel utilization, and 5) a powered device dropping certain messages that have a next-hop destination to a reduced-power device to reduce power and channel utilization.

A system in accordance with this illustrative embodiment: 1) increases the lifetime of a network during a power outage event by utilizing channel-sampling techniques and dropping unimportant traffic, 2) allows devices that have no powered neighbors to communicate Power Outage Notification messages and any other important message by utilizing power-outage devices operating in reduced power mode, 3) decreases latency of network restoration by continuing to maintain channel-hopping synchronization and the routing topology, and 4) supports other diagnostic protocols that would otherwise not be possible if devices could no longer communicate across the network.

While there have been shown and described illustrative embodiments that provide for different receive modes in a frequency hopping network, it is to be understood that various other adaptations and modifications may be made within the spirit and scope of the embodiments herein. For example, the embodiments have been shown and described herein with relation to wireless networks, such as LLNs. However, the embodiments in their broader sense are not as limited, and may, in fact, be used with other types of networks and/or protocols, such as PLC (power line communication). Also, while the description above relates to packets and packet headers, the techniques may be equally applicable to non-packetized transmissions.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken is only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    operating a communication device according to a particular frequency hopping sequence in a communication network, the particular frequency hopping sequence having a plurality of timeslots each corresponding to a particular frequency within the frequency hopping sequence, each timeslot divided into a plurality of sub-timeslots; and
    operating the communication device in a first mode, wherein the first mode comprises:
        sampling the particular frequency hopping sequence by a receiver of the communication device during only a particular specified sub-timeslot of a timeslot;
        detecting whether a transmission energy is detected during the specified sub-timeslot;
        in response to detecting that there is no transmission energy during the specified sub-timeslot, turning off the receiver for a remainder of the sub-timeslots in the timeslot;
        in response to detecting that there is transmission energy during the specified sub-timeslot, continuing to sample the particular frequency hopping sequence for at least one or more additional sub-timeslots of the remainder of the sub-timeslots in the timeslot until no transmission energy is detected in one of the at least one or more additional sub-timeslots, wherein continuing to sample the particular frequency hopping sequence for at least one or more additional sub-timeslots of the remainder of the timeslot comprises:
            determining whether the transmission energy is from a transmission meant for the communication device,
            keeping the receiver on for at least a duration of the transmission in response to the transmission being meant for the communication device, and
            turning off the receiver in response to the transmission not being meant for the communication device; and
        in response to detecting no transmission energy while continuing to sample the particular frequency hopping sequence in the at least one or more additional sub-timeslots, turning off the receiver for the remainder of the sub-timeslots in the timeslot subsequent the one at least one or more additional sub-timeslot.

2. The method as in claim 1, wherein sampling during only the specified sub-timeslot comprises sampling an initial sub-timeslot of each timeslot of the particular frequency hopping sequence.

3. The method as in claim 1, wherein sampling during only the specified sub-timeslot comprises sampling the specified sub-timeslot of only certain timeslots of the particular frequency hopping sequence.

4. The method as in claim 1, further comprising:
    selecting operation of the communication device between the first mode and a second mode; and
    operating the communication device in the second mode, wherein the second mode comprises: sampling the particular frequency hopping sequence by the receiver of the communication device during all non-transmitting sub-timeslots of the particular frequency hopping sequence.

5. The method as in claim 4, wherein selecting comprises: selecting the first mode in response to a power reduction at the communication device.

6. The method as in claim 1, further comprising:
    informing one or more neighboring devices that the communication device is operating according to the first mode.

7. The method as in claim 6, wherein informing comprises:
    including an indication within a message, wherein the message is one of:
        an explicit indication message having the indication;
        an outgoing message having the indication piggybacked therein; or
        an outgoing acknowledgement message having the indication piggybacked therein.

8. An apparatus, comprising:
    a processor; and
    a receiver configured to communicate in a communication network according to a particular frequency hopping sequence, the particular frequency hopping sequence having a plurality of timeslots each corresponding to a particular frequency within the frequency hopping sequence, each timeslot divided into a plurality of sub-timeslots according to a first mode;
    wherein the receiver is configured to operate in a first mode, wherein the receiver and processor when operated in the first mode are operable to:

sample the particular frequency hopping sequence during only a particular specified sub-timeslot of a timeslot;

detect whether a transmission energy is detected during the specified sub-timeslot;

in response to detecting that there is no transmission energy during the specified sub-timeslot, turn off the receiver for a remainder of the sub-timeslots within the timeslot; and in response to detecting that there is transmission energy during the specified sub-timeslot, continue to sample the particular frequency hopping sequence for at least one or more additional sub-timeslots of the sub-timeslots in the timeslot until no transmission energy is detected in one of the at least one or more additional sub-timeslots, wherein continuing to sample the particular frequency hopping sequence for at least one or more additional sub-timeslots of the remainder of the timeslot includes:

determining whether the transmission energy is from a transmission meant for the receiver, keeping the receiver on for at least a duration of the transmission in response to the transmission being meant for the receiver, and turning off the receiver in response to the transmission not being meant for the receiver; and in response to detecting no transmission energy while continuing to sample the particular frequency hopping sequence in the at least one or more additional sub-timeslots, turning off the receiver for the remainder of the sub-timeslots in the timeslot subsequent the one at least one or more additional sub-timeslot.

9. The apparatus as in claim 8, wherein the receiver and processor, when operated in the first mode to sample during only the specified sub-timeslot, are further operable to: sample an initial sub-timeslot of each timeslot of the particular frequency hopping sequence.

10. The apparatus as in claim 8, wherein the receiver and processor are further operable to:

select operation of the receiver between the first mode and a second mode; and wherein the receiver and processor when operated in the second mode are operable to: sample the particular frequency hopping sequence by the receiver during all non-transmitting sub-timeslots of the particular frequency hopping sequence.

11. The apparatus as in claim 10, wherein the receiver and processor, when operable to select, are further operable to:

select the first mode in response to a power reduction at the apparatus.

\* \* \* \* \*

UNITED STATES PATENT AND TRADEMARK OFFICE
CERTIFICATE OF CORRECTION

PATENT NO. : 9,450,642 B2  
APPLICATION NO. : 13/180853  
DATED : September 20, 2016  
INVENTOR(S) : Jonathan W. Hui et al.

Page 1 of 2

It is certified that error appears in the above-identified patent and that said Letters Patent is hereby corrected as shown below:

In the Specification

Column 3, Line 7, please amend as shown:
reference to a generally wireless network, the description Column 3, Line 48, please amend as shown:
or no memory ( e.g., no memory for storage other than for Column 4, Line 25, please amend as shown:
a needed route to a destination, sends a route request into Column 6, Line 23, please amend as shown:
device by communicating its channel sequence, time slot Column 6, Line 64, please amend as shown:
is not detected during the specified sub-timeslot, the Column 10, Line 6, please amend as shown:
still not received, then the device may no longer be Column 11, Line 23, please amend as shown:
e.g., based on an indication from neighboring communication Column 12, Line 41, please amend as shown:
forward Power Outage Notifications from devices Column 13, Line 14, please amend as shown:
receive messages sent to it using power-reduced Signed and Sealed this  
Fourteenth Day of May, 2019

Andrei Iancu  
*Director of the United States Patent and Trademark Office*

CERTIFICATE OF CORRECTION (continued)
U.S. Pat. No. 9,450,642 B2

Column 14, Line 25, please amend as shown:
hop is not in power reduction mode

Column 14, Line 63, please amend as shown:
reduced-power mode due to spatial locality of power Column 15, Line 38, please amend as shown:
description is to be taken only by way of example and not